United States Patent
Gong et al.

(10) Patent No.: US 12,187,866 B2
(45) Date of Patent: Jan. 7, 2025

(54) CELLULOSE COMPOSITE FILM, AND ITS PREPARATION METHOD

(71) Applicant: ShenZhen YUTO Packaging Technology Co., Ltd., Shenzhen (CN)

(72) Inventors: Junjie Gong, Shenzhen (CN); Mengyao Li, Shenzhen (CN)

(73) Assignee: ShenZhen YUTO Packaging Technology Co., Ltd., Shenzhen (CN)

(*) Notice: Subject to any disclaimer, the term of this patent is extended or adjusted under 35 U.S.C. 154(b) by 169 days.

(21) Appl. No.: 18/096,541

(22) Filed: Jan. 12, 2023

(65) Prior Publication Data
US 2024/0018320 A1 Jan. 18, 2024

(30) Foreign Application Priority Data
Jul. 15, 2022 (CN) .................. 202210838590.X

(51) Int. Cl.
C08J 7/043 (2020.01)
C08K 5/101 (2006.01)
C09D 127/08 (2006.01)
C09D 175/04 (2006.01)

(52) U.S. Cl.
CPC .............. *C08J 7/043* (2020.01); *C08K 5/101* (2013.01); *C09D 127/08* (2013.01); *C09D 175/04* (2013.01); *C08J 2301/02* (2013.01); *C08J 2327/08* (2013.01); *C08J 2375/04* (2013.01)

(58) Field of Classification Search
None
See application file for complete search history.

(56) References Cited

FOREIGN PATENT DOCUMENTS

CN     113234247 A    *   8/2021

* cited by examiner

*Primary Examiner* — Alexander M Weddle
(74) *Attorney, Agent, or Firm* — Arch & Lake LLP

(57) ABSTRACT

A cellulose composite film, and a method for producing a cellulose composite film are provided. The cellulose composite film includes a cellulose film, a primer layer that is disposed on one side of the cellulose film, and a barrier layer that is disposed on one side of the primer layer. The cellulose film includes a regenerated cellulose film, the primer layer includes polyurethane film-forming resin, and the barrier layer includes a polyvinylidene chloride (PVDC) coating with an anti-fogging agent.

20 Claims, 1 Drawing Sheet

Providing a cellulose film — S10

Coating an undercoating glue on one side of the cellulose film, and forming a primer layer — S20

Coating a barrier coating on one side of the primer layer, and forming a barrier layer — S30

CELLULOSE COMPOSITE FILM, AND ITS PREPARATION METHOD

CROSS-REFERENCE TO RELATED APPLICATION

This application is based upon and claims priority to Chinese Patent Application No. 202210838590.X, filed on Jul. 15, 2022, the entire content of which is incorporated herein by reference for all purposes.

TECHNICAL FIELD

The present disclosure relates to the technical field of packaging materials, in particular to a cellulose composite film, a preparation method, and a product packaging.

BACKGROUND

With the rapid development of the economy and the improvement of quality of life, the demand for daily necessities such as food is also increasing, which will directly promote the demand for related product packaging. In order to facilitate people's choice of food, related product packaging is usually designed as a visible or partially visible product packaging. That is, the appearance of the product inside can be observed without opening the product packaging. However, since some food need to be stored under refrigerated conditions, when the food is put into or taken out of the refrigerated environment, water mist may adhere to the surface of the product packaging, which cannot meet the needs of visualization.

SUMMARY

The present disclosure provides a cellulose composite film and its preparation method to meet the environmental protection needs and visualization needs of packaging boxes.

According to a first aspect of the present disclosure, a cellulose composite film is provided, the cellulose composite film including: a cellulose film; a primer layer disposed on one side of the cellulose film; a barrier layer disposed on one side of the primer layer; where the cellulose film comprises a regenerated cellulose film, the primer layer comprises polyurethane film-forming resin, and the barrier layer comprises a polyvinylidene chloride (PVDC) coating with an anti-fogging agent.

According to a second aspect of the present disclosure, a method for producing a cellulose composite film is provided, the method including: providing a cellulose film; coating an undercoating glue on one side of the cellulose film, and forming a primer layer; coating a barrier coating on one side of the primer layer, and forming a barrier layer to obtain the cellulose composite film; wherein the cellulose film comprises a regenerated cellulose film, the primer layer comprises polyurethane film-forming resin, and the barrier layer comprises a polyvinylidene chloride (PVDC) coating with an anti-fogging agent.

According to a third aspect of the present disclosure, a product packaging is provided, the product packaging including a cellulose composite film as described in the first aspect of the present disclosure.

It is to be understood that the foregoing general description and the following detailed descriptions are exemplary and explanatory only and are not restrictive of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
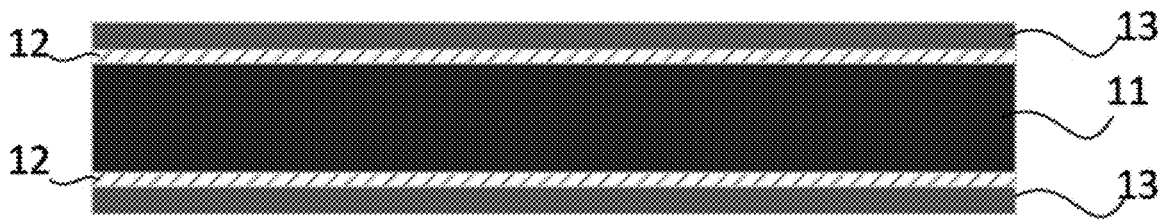
FIG. 1 illustrates the schematic structural view of cellulose composite film in accordance with some examples of the present disclosure.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The term "comprising", "comprising" or any other variation thereof is intended to cover a non-exclusive inclusion such that a process, method, article or apparatus comprising a set of elements includes not only those elements. It also includes other elements not expressly listed, or elements inherent in the process, method, article, or device. Without further limitations, an element defined by the phrase "comprising a . . . " does not preclude the presence of additional identical elements in the process, method, article, or apparatus comprising that element, and furthermore, Components, features, and elements with the same name in different examples of the present disclosure may have the same meaning, or may have different meanings, and their specific meanings need to be explained in this specific example or further combined with the context of this specific example.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that". Furthermore, as used herein, the singular forms "a", "an" and "the" are intended to include the plural forms as well, unless the context indicates otherwise. It should be further understood that the terms "comprising", "comprising" indicate the presence of stated features, steps, operations, elements, components, items, species, and/or groups, but do not exclude one or more other features, steps, operations. The existence, occurrence or addition of an element, component, item, species, and/or group. The terms "or" and "and/or" as used herein are to be construed as inclusive, or to mean either one or any combination. Thus, "A, B, or C" or "A, B, and/or C" means "any of the following: A; B; C; A and B; A and C; B and C; A, B, and C". Exceptions to this definition will only arise when combinations of elements, functions, steps or operations are inherently mutually exclusive in some way.

It should be noted that, in the present disclosure, step codes such as XX, XX, etc. are used, the purpose of which is to express the corresponding content more clearly and concisely and does not constitute a substantive restriction on the order. Those skilled in the art\in specific implementation, it is possible to implement XX first and then XX, etc., but these should be within the scope of protection of this application.

FIG. 1 is a schematic structural view of a cellulose composite membrane provided in the examples of this application. Explanation of reference signs: 10 cellulose composite film; 11 cellulose film; 12 primer layer; 13 barrier layer.

In related technologies, polyethylene terephthalate (polyethylene glycol terephthalate, PET), polyvinyl chloride (polyvinyl chloride, PVC), etc. are often used as packaging materials to meet the packaging visualization needs of refrigerated foods. However, these materials are difficult to degrade and will cause great harm to the environment after entering the environment.

As mentioned in the background technology, in order to meet the visualization needs of product packaging in a refrigerated environment, non-degradable materials such as PET and PVC are mostly used as packaging materials. If product packaging is discarded at will, it will cause great pollution to the environment after entering the environment.

Related technologies also relate to product packaging using degradable materials, such as cellulose films, as packaging materials to improve the environmental performance of product packaging. However, the barrier performance and heat-sealing performance of product packaging boxes made of packaging materials represented by cellulose film are not ideal, and it is difficult to meet the needs of visualization and preservation of product packaging in a refrigerated environment.

In view of this, the present disclosure provides a cellulose composite membrane and a preparation method thereof after deep thinking and a large number of experiments.

The first aspect of the present disclosure provides a cellulose composite film, including: a cellulose film; a primer layer, located on the surface of the cellulose film; a barrier layer, located on the surface of the primer layer; where the cellulose film is selected from self-regenerating cellulose film; the primer layer includes polyurethane film-forming resin; the barrier layer is polyvinylidene chloride (PVDC) coating including anti-fogging agent.

The present disclosure does not limit the type of cellulose film, which can be a commonly used, degradable regenerated cellulose film in the art, and those skilled in the art can choose voluntarily according to the needs of product packaging. The regenerated cellulose film has good plasticity and suitable strength, and it is easy to form a firm integrated structure with the primer and the barrier layer. Thus, the composite cellulose film of the present disclosure can have good processability.

The present disclosure does not limit the type of primer layer. The primer layer can be a primer layer that contains polyurethane film-forming resin with good adhesion to both the cellulose film and the barrier layer. Those skilled in the art can choose according to their needs. As an example, the primer layer can be the primer selected by those skilled in the art based on the use of the cellulose composite film. For example, when the cellulose composite film is used to prepare a food packaging box, the primer layer can be a food packaging-specific polyurethane adhesive. The primer layer containing the polyurethane film-forming resin has good compatibility with the cellulose film and the barrier layer, thus, the structural stability of the cellulose composite film can be further improved, thereby improving the product packaging using the cellulose composite film barrier properties.

In the present disclosure, the barrier layer can be a PVDC coating selected according to the application of the cellulose composite film. The present disclosure does not limit the type of antifogging agent in the barrier layer, which can be selected from low molecular weight dispersants containing hydrophilic groups, for example, can be selected from xylitol esters, sorbitol monopalmitate, lauric acid, glyceryl stearate, glycerol esters, polyglycerol esters, etc. Chlorine atoms in PVDC molecules are hydrophobic and will not form hydrogen bonds. Oxygen molecules and water molecules are difficult to move in PVDC molecules, so that it has excellent oxygen resistance and moisture resistance, and its oxygen resistance is not affected by the surrounding environment. The effect of humidity. That is to say, under any temperature or humidity conditions, the PVDC coating can fully block water vapor, oxygen and odor, thereby improving the barrier performance of the cellulose composite film. In addition, PVDC has good weather resistance, and when the anti-fog agent is wrapped in the PVDC coating, it can have high stability, so that the barrier layer has long-term stable anti-fog performance. Furthermore, the PVDC coating also has good heat-sealing performance, which can make the cellulose composite film have high heat-sealing strength, thereby improving the processability of the cellulose composite film.

In the present disclosure, the cellulose film includes two surfaces in the thickness direction. The primer layer can be located on both surfaces of the cellulose film, and the surface of the primer is provided with a barrier layer. FIG. 1 is a schematic diagram of an example of the cellulose composite membrane of the present application. The cellulose composite film 10 includes a cellulose film 11, a primer layer 12, and a barrier layer 13. The primer layer 12 is located on both surfaces of the cellulose film 11, and the barrier layer 13 is located on the surface of the primer layer 12.

Not intended to be limited by any theory or explanation, the cellulose film composite membrane of the present application uses regenerated cellulose film as the base film, the regenerated cellulose film is degradable, and it is not easy to pollute the environment when it enters the environment. Therefore, the fiber of the present disclosure, the plain composite film has excellent environmental performance. In addition, compared with the cellulose film, the barrier layer has higher heat-sealing strength and better barrier performance. Thus, when the cellulose composite film of the present application is applied to product packaging, it can prolong the shelf life of the product. In the cellulose composite film of the present application, the primer layer bonds the cellulose film and the barrier layer into an integrated structure, and the barrier layer includes an antifogging agent, so that the hydrophilic group in the antifogging agent can absorb the air in the air. The water molecules wet and diffuse on the surface of the barrier layer to form an ultra-thin transparent water film, thereby reducing the risk of water molecules in the air aggregating into water droplets and then forming water mist. Thus, when the cellulose composite film of the present application is applied to the packaging of refrigerated foods, it can prevent the moisture from forming mist on the inner or outer walls of the package due to the rapid temperature difference between cold and heat when the food is taken out of the refrigerated device or put into the refrigerated device. In this way, the visualization needs of related product packaging can be met.

In some examples, the barrier layer may include the following raw material components: 100 parts by weight of PVDC monomers, 1.5 to 3 parts by weight of emulsifiers, 0.2 to 0.6 parts by weight of initiators, 0.05 to 0.2 parts by weight of buffering agent, 3 to 5 parts by weight of antifogging agent and 1.5 to 2.5 parts by weight of anti-sticking agent; wherein, based on the total mass of the monomer, the monomer includes 85 wt %~92 wt % of vinylidene chloride, 7 wt %~9.5 wt % methyl acrylate and 0.5 wt %~6 wt % acrylic acid.

Not intending to be limited by any theory or explanation, when the barrier layer includes the above raw material components, PVDC has good compatibility with the antifogging agent, which can make the antifogging agent wrapped in the PVDC coating, thereby making the antifogging agent The agent has high stability, which in turn makes the cellulose composite film have long-term stable anti-fog performance. Therefore, the cellulose composite film of the present disclosure can have good barrier performance, heat sealing performance, processability and anti-fog performance, and when applied to product packaging, it can make product packaging have excellent comprehensive performance and meet the requirements of cold storage conditions visualization needs.

Figure 2:
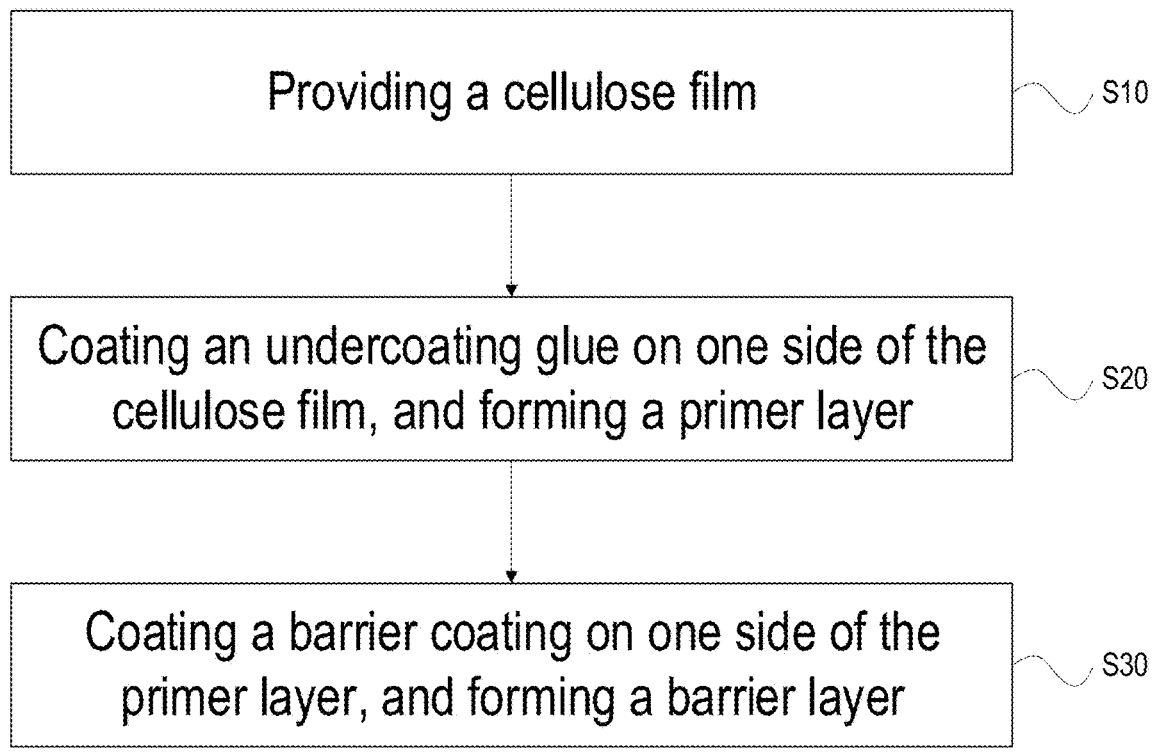
FIG. 2 is a block diagram illustrating a method for producing a cellulose composite film in accordance with some examples of the present disclosure.

The second aspect of the present disclosure provides a method for preparing the cellulose composite membrane of the first aspect of the present application, including the following steps S10~S30, as illustrated in FIG. 2.

S10, providing a cellulose film.

S20, coating a primer on the surface of the cellulose film to form a primer layer.

S30, coating a barrier coating on the surface of the primer layer to form a barrier layer, thereby obtaining a cellulose composite membrane.

Where, the cellulose film is selected from regenerated cellulose film; the primer layer includes polyurethane film-forming resin; the layer is a polyvinylidene chloride PVDC coating including an anti-fogging agent.

The above-mentioned cellulose film, primer layer, barrier layer and antifogging agent can be selected from the ones described in the first aspect of the application The cellulose film, primer, barrier layer and anti-fogging agent will not be repeated here.

In step S20 and step S30, the coating method is not limited, it can be a coating method known in the art, for example, coats with a gravure roll.

In the method of the present disclosure, a primer layer is formed on the surface of the cellulose film, and a barrier coating is coated on the surface of the primer layer to form a barrier layer, thereby obtaining a cellulose composite film. In the cellulose composite film, the regenerated cellulose film is degradable, and it is difficult to pollute the environment when entering the environment. Therefore, the cellulose composite film prepared according to the method of the present application has excellent environmental performance. In addition, compared with the cellulose film, the barrier layer has higher heat-sealing strength and barrier performance. Thus, when the cellulose composite film prepared according to the method of the present application is applied to product packaging, the shelf life of the product can be extended. In the cellulose composite film prepared according to the method of the present application, the primer layer bonds the cellulose film and the barrier layer into an integrated structure, the barrier layer includes an antifogging agent, and the cellulose composite film can pass through the antifogging agent. The hydrophilic group adsorbs water molecules in the air, and wets and diffuses on the surface of the barrier layer to form an ultra-thin transparent water film, thereby reducing the possibility of water molecules in the air aggregating into fine water droplets and then forming water mist, risk. Thus, when the cellulose composite film prepared according to the method of the present application is applied to the packaging of refrigerated food, it can reduce the formation of water mist on the inner or outer wall of the package due to the rapid temperature difference between cold and heat when the food is taken out of the refrigerator or put into the refrigerator, so as to meet the visualization needs of related product packaging.

In some examples, the preparation method may further include: 100 parts by weight of PVDC monomers, 1.5 to 3 parts by weight of emulsifiers, 0.2 to 0.6 parts by weight of initiators, 0.05 to 0.2 parts by weight of buffers, 3 parts by weight ~5 parts by weight of antifogging agent and 1.5~2.5 parts by weight of anti-sticking agent are mixed to form a barrier coating.

Not intending to be bound by any theory or explanation, the barrier coating is prepared through the above steps, and in the formed PVDC coating including the anti-fogging agent, PVDC can have a suitable molecular structure and can have good compatibility with the anti-fogging agent. PVDC has a suitable molecular structure, such as suitable chlorine atom content, suitable cyano group content, suitable molecular weight, etc., which can make PVDC coatings have good barrier performance, heat sealing performance and weather resistance. PVDC has good compatibility with anti-fogging agent, which can make anti-fogging agent wrapped in PVDC coating, so that the anti-fogging agent has high stability, and then makes the cellulose composite film have long-term stable anti-fogging performance. Thus, the cellulose composite film prepared according to the method of the present application can have good barrier performance, heat sealing performance, processability and anti-fog performance, and can be applied to product packaging, which can make the product packaging have excellent comprehensive performance and meet the visualization needs under refrigerated conditions.

In some examples, in the above step of preparing the barrier coating, each component can satisfy at least one of the following (1) to (5).

(1) The emulsifier is selected from the emulsifier mixed with sodium secondary alkane sulfonate and dodecylphenol polyoxyethylene ether in a mass ratio of 2:1~3:1.

(2) The initiator is selected from the initiator mixed with potassium persulfate and sodium bisulfite in a mass ratio of 1:1~2:1.

(3) The buffers are Na2HPO4 and NaH2PO4.

(4) The antifogging agent is selected from one or more of glyceryl stearate, xylitol ester, lauric acid or sorbitol monopalmitate.

(5) The release agent is at least one selected from silicone or organic wax. As an example, the release agent may be at least one of silicic acid sol or carnauba wax.

In some examples, the preparation method can also include mixing one or more of glyceryl stearate, xylitol ester, lauric acid or sorbitol monopalmitate to form an anti-fogging agent.

In the step of forming the antifogging agent, glyceryl stearate, xylitol ester, lauric acid or sorbitol monopalmitate can be mixed in any proportion, which is not limited here.

In some examples, the preparation method may further include based on a total amount of 100 wt %, 85 wt %~92 wt % of vinylidene chloride, 7 wt %~9.5 wt % of methyl acrylate and 0.5 wt %~6 wt % of acrylic acid is mixed to form the monomers of PVDC.

It is not intended to be limited by any theory or explanation. By preparing PVDC monomers through the above steps, the PVDC obtained in subsequent steps can have a suitable molecular structure and can have good compatibility with antifogging agents. PVDC has a suitable molecular structure, such as suitable chlorine atom content, suitable cyano group content, suitable molecular weight, etc., which can make PVDC coatings have good barrier performance, heat sealing performance and weather resistance.

In some examples, coating the barrier coating on the surface of the primer layer may include coating the barrier coating on the surface of the primer layer by a reverse coating roller.

Not intending to be bound by any theory or explanation, by applying the barrier coating on the surface of the primer layer by the reverse coating roller, the coating amount of the barrier coating can be controlled more precisely, and the barrier layer formed by the barrier coating has a more uniform thickness. The coating amount of the barrier coating is in an appropriate range, which can make the barrier layer have a suitable thickness, so that the effect of the barrier layer on improving barrier performance and heat sealing performance can be fully exerted; the barrier layer has better thickness uniformity, which can make Water molecules form a thinner transparent water film on the surface of the barrier layer, which makes the cellulose composite film have excellent anti-fog performance.

In some examples, after the barrier coating is coated on the surface of the primer layer, the preparation method may further include curing the cellulose composite film at a temperature of 30° C. to 40° C.

After curing, a large number of antifogging agent molecules can migrate to the surface of the barrier layer away from the primer layer, thereby further improving the antifogging performance of the cellulose composite film.

EXAMPLES

The following examples describe the present disclosure more specifically, and these examples are for illustrative purposes only, since various modifications and changes within the scope of the present disclosure will be apparent to those skilled in the art. Unless otherwise stated, all parts, percentages, and ratios reported in the following examples are based on weight, and all reagents used in the examples are commercially available or synthesized according to conventional methods, and can be directly The instruments used without further processing, as well as in the examples, are commercially available.

The reagents used in the following examples and comparative examples are as follows:

PVDC monomer: based on the total mass of 100 wt %, including 90 wt % vinylidene chloride, 8 wt % methyl acrylate, and 2 wt % acrylic acid;

Emulsifier: It is formed by mixing sodium secondary alkane sulfonate and dodecylphenol polyoxyethylene ether with a mass ratio of 3:1;

Initiator: Potassium persulfate and sodium bisulfite mixed in a mass ratio of 2:1; Buffer: Na2HPO4/NaH2PO4 buffer; Antifogging agent: glyceryl stearate;

Anti-sticking agent: silicic acid sol;

Primer glue: Polyurethane glue, grade is Taiwan Green Ring H66-150.

Example 1

Mix 100 parts by weight of PVDC monomer, 1.5 parts by weight of emulsifier, 0.2 parts by weight of initiator, 0.05 parts by weight of buffer, 3 parts by weight of antifogging agent, and 1.5 parts by weight of anti-sticking agent to make the monomer undergo a polymerization reaction at the reaction temperature, thereby obtaining a PVDC coating including an anti-fogging agent;

Coat the primer with a dry weight of 0.5 g/m$^2$ on one side and use a gravure roll to coat the primer on both surfaces of the regenerated cellulose film with a thickness of 401 μm, and dry it to form a primer layer;

Apply a PVDC coating on the surface of the primer layer with a reverse coating roller at a dry weight of 2.5 g/m$^2$ on one side, and dry it to obtain a cellulose composite film;

The cellulose composite film is rolled up and placed in an environment of 30° C.~40° C. for 48 hours to cure the coating.

Example 2

Mix 100 parts by weight of PVDC monomer, 2 parts by weight of emulsifier, 0.6 parts by weight of initiator, 0.08 parts by weight of buffer, 4 parts by weight of antifogging agent, and 2 parts by weight of anti-sticking agent to make the monomer undergo a polymerization reaction at the reaction temperature, thereby obtaining a PVDC coating including an anti-fogging agent;

Coat the primer with a dry weight of 0.5 g/m$^2$ on one side and use a gravure roll to coat the primer on both surfaces of the regenerated cellulose film with a thickness of 401 μm, and dry it to form a primer layer;

With a single-sided coating dry weight of 2.5 g/m$^2$, use a reverse coating roller to coat the primer with PVDC coating on the surface of the primer layer, and dry it to obtain a cellulose composite film;

The cellulose composite film is rolled up and placed in an environment of 30° C.~40° C. for 48 hours to cure the coating.

Example 3

Mix 100 parts by weight of PVDC monomer, 3 parts by weight of emulsifier, 0.6 parts by weight of initiator, 0.2 parts by weight of buffer, 5 parts by weight of antifogging agent, and 2.5 parts by weight of anti-sticking agent to make the monomer undergo a polymerization reaction at the reaction temperature, thereby obtaining a PVDC coating including an anti-fogging agent;

Coat the primer with a dry weight of 0.5 g/m$^2$ on one side, and use a gravure roller to coat the primer on both surfaces of the regenerated cellulose film with a thickness of 40 μm, and dry it to form a primer layer;

With a single-side coating dry weight of 2.5 g/m$^2$, use a reverse coating roller to coat the primer with PVDC coating on the surface of the primer layer, and dry it to obtain a cellulose composite film;

Roll the cellulose composite film and place it in an environment of 30° C.~40° C. for 48 hours for coating mature.

Example 4

Based on the preparation process of Example 2, adjust the dry weight of one-side coating of the primer to 0.3 g/m$^2$ and the dry weight of single-side coating of the barrier layer to 2.0 g/m² to prepare the cellulose composite film of Example 4.

Example 5

Based on the preparation process of Example 2, adjust the dry weight of one-side coating of the primer to 0.4 g/m² and the dry weight of single-side coating of the barrier layer to 4.0 g/m², and prepare the cellulose composite film of Example 5.

Example 6

Based on the preparation process of Example 2, the thickness of the regenerated cellulose membrane was adjusted to 20 μm, and the cellulose composite membrane of Example 6 was prepared.

Comparative Example 1~2

Based on the preparation process of Example 1, the preparation parameters were adjusted to prepare the cellulose composite membranes of Comparative Example 1-2. Among them, no barrier layer was set in Comparative Example 1, and no anti-fogging agent was added to the PVDC coating of Comparative Example 2.

Comparative Example 3

The preparation process was the same as in Example 1, except that the regenerated cellulose film was replaced by a PVC film of equal thickness.

TEST PART

Degradation Rate Test

According to the controlled composting of GB/T 19277.1 (ISO 14855-1), the degradation rate of the cellulose composite film was determined, and the results are shown in Table 1.

Water Permeability Test

According to the standard of GB/T 1037, the water vapor transmission rate w1 (g/m²/day) of the cellulose composite membranes of Examples 1~6 and Comparative Examples 1~3 was measured under the ambient gas of 38° C. and 90% RH, and the measurement results are shown in Table 2.

Oxygen Permeability Test

According to the standard of ASTM D3985, the oxygen transmission rate w2 (g/m²/day) of the cellulose composite membranes of Examples 1~6 and Comparative Examples 1~3 was measured under the ambient gas of 23° C. and 0% RH, and the measurement results are as follows Table 2 shows.

Anti-Fog Performance Test

According to the standard of GB/T 31726-2015, the anti-fog levels of the cellulose composite films of Examples 1-6 and Comparative Examples 1-3 were measured, and the results are shown in Table 2. Among them, according to the provisions of GB/T 31726-2015, the anti-fog level includes level 1 to level 5, and the anti-fog performance from level 1 to level 5 decreases in order.

Heat Sealing Performance Test

According to GB/T 40933-2021, the heat seal strength of the cellulose composite films of Examples 1-6 and Comparative Examples 1-3 were measured, and the results are shown in Table 2.

TABLE 1

| Test Standard | Test Time | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| ISO 14855-1 | 7 days | 14.7% | 13.4% | 15.6% | 17.5% | 14.3% | 13.8% | 16.9% | 15.8% | 0% |
| | 14 days | 28.7% | 28.4% | 27.7% | 29.3% | 26.2% | 27.5% | 31.7% | 28.7% | 0% |
| | 28 days | 54.5% | 50.3% | 55.5% | 58.2% | 49.5% | 59.2# | 60.5% | 56.5% | 0% |
| | 42 days | 67.6% | 64.7% | 66.8% | 69.3% | 62.7% | 61.3% | 72.6% | 67.8% | 0% |
| | 56 days | 72.9% | 71.5% | 73% | 74.8% | 68.9% | 69.3% | 78.9% | 72.9% | 0% |
| | 70 days | 80.5% | 80.2% | 81.7% | 84.9% | 78.9% | 79.2% | 87.5% | 81.4% | 0% |
| | 84 days | 88.3% | 88.3% | 89.3% | 90.3% | 85.2% | 84.9% | 92.3% | 89.3% | 0% |
| | 98 days | 92.9% | 90.8% | 93.7% | 94.1% | 90.7% | 89.9% | 97.9% | 94.2% | 0% |

TABLE 2

| Serial Number | W1/(g/m²/day) | w2/(cc/m²/day) | Anti-fog level | Heat seal strength/ (N/15 mm) |
|---|---|---|---|---|
| Example 1 | 30 | 5 | 3 | 3 |
| Example 2 | 33 | 7 | 2 | 3 |
| Example 3 | 35 | 8 | 1 | 2.5 |
| Example 4 | 40 | 10 | 2 | 2.5 |
| Example 5 | 25 | 3 | 2 | 3.5 |
| Example 6 | 35 | 8 | 2 | 3.5 |
| Comparative Example 1 | >500 | <10 | 1 | 0 |
| Comparative Example 1 | 32 | 5 | 4~5 | 3.5 |
| Comparative Example 1 | <5 | <1 | 1~2 | >10 |

It can be seen from Table 1 and Table 2 that the cellulose composite film provided by this application has degradability, good barrier performance, good heat-sealing performance and excellent anti-fog performance.

In contrast, Comparative Example 1 did not set a barrier layer, and the heat-sealing strength of the obtained film was 0, and the barrier performance was poor, which could not meet the needs of the preparation of the packaging box and the preservation of food. No anti-fog agent was added to the barrier layer of Comparative Example 2, and the anti-fog grade of the obtained film was 4-5, which was difficult to meet the visualization needs of refrigerated food packaging. The film material of Comparative Example 3 uses PVC film as the base film. Although it has high heat-sealing strength and excellent barrier properties, it is difficult to degrade and has no environmental protection performance.

The present disclosure provides a cellulose composite film, comprising: a cellulose film; the primer layer is positioned on the surface of the cellulose film; the barrier layer is positioned on the surface of the primer layer; wherein, the cellulose film is selected from regenerated cellulose film; the primer layer includes polyurethane film-forming resin; and the barrier layer includes a polyvinylidene chloride (PVDC) coating with an antifogging agent.

The cellulose composite membrane of the present disclosure takes the regenerated cellulose membrane as the base membrane, and the regenerated cellulose membrane can be degraded, further it is not easy to pollute the environment, therefore, the cellulose composite membrane of the present disclosure has excellent environmental protection guaranteed performance. In addition, the barrier layer has higher heat-sealing strength and barrier properties compared to the cellulose film, therefore, when the cellulose composite film of the present disclosure is applied to product packaging, the shelf life of the product can be extended. In the cellulose composite film, the primer layer bonds the cellulose film and the barrier layer into an integrated structure, and the barrier includes an anti-fogging agent, which can absorb water molecules in the air through the hydrophilic groups in the anti-fogging agent, and wet and diffuse on the surface of the barrier layer to form an ultra-thin transparent water film, thereby reducing the water in the air risk of molecules aggregating into fine droplets and thus forming a mist. Thus, when the cellulose composite film of the present disclosure is applied to the packaging of refrigerated food, it can reduce the formation of water mist on the inner or outer wall of the package due to the rapid temperature difference between cold and heat when the food is taken out of the refrigerated device or put into the refrigerated device. In this way, the visualization needs of related product packaging can be met.

In any example of the first aspect of the present disclosure, the antifogging agent is selected from glyceryl stearate, xylitol one or more of esters, lauric acid or sorbitol monopalmitate.

In any example of the first aspect of the present disclosure, the thickness of the cellulose film is 20 μm to 40 μm; the thickness of the primer layer is 0.2 μm to 0.4 μm; the thickness of the barrier layer is 1.5 μm to 3 μm.

In any example of the first aspect of the application, the coating dry weight of the single-side primer layer is 0.3 g/m²~0.5 g/m².

In any example of the first aspect of the present disclosure, the coating dry weight of the single-sided barrier layer is 2.0 g/m²~4.0 g/m².

In any example of the first aspect of the present disclosure, the barrier layer includes the following raw material components:

100 parts by weight of PVDC monomer, 1.5~3 parts by weight of emulsifier, 0.2~0.6 parts by weight of initiator agent, 0.0~50.2 parts by weight of buffer agent, 3~5 parts by weight of antifogging agent and 1.5~2.5 parts by weight of anti-sticking agent; wherein, based on the total mass of the monomer, the monomer includes 85 wt % to 92 wt % of vinylidene chloride, 7 wt %~9.5 wt % methyl acrylate and 0.5 wt %~6 wt % acrylic acid.

The second aspect of the present disclosure provides a method for preparing the cellulose composite film of the first aspect of the present disclosure, comprising: providing a cellulose film; coating a primer on the surface of the cellulose film to form a primer layer; the surface of the primer layer is coated with a barrier coating to form a barrier layer, thereby obtaining a cellulose film; wherein the cellulose film is selected from a regenerated cellulose film; the primer layer includes a polyurethane film-forming resin; the barrier layer includes an antifogging agent polyvinylidene chloride PVDC coating.

In any example of the second aspect of the present disclosure, the preparation method also includes: 100 parts by weight of PVDC monomer, 1.5~3 parts by weight of emulsifier, 0.2~0.6 parts by weight of initiator, 0.05~0.2 parts by weight of buffer, 3~5 parts by weight of antifogging agent and 1.5~2.5 parts by weight of anti-sticking agent are mixed to form a prepared barrier coating.

In any example of the second aspect of the present disclosure, the preparation method also includes: mixing one or more of glyceryl stearate, xylitol ester, lauric acid or sorbitol monopalmitate to form an anti-fog agent.

In any example of the second aspect of the present disclosure, the preparation method also includes: 85 wt %~92 wt % of vinylidene chloride, 7 wt %~9.5 wt % of methyl acrylate and 0.5 wt % %~6 wt % of acrylic acid mixed to form PVDC monomer.

In any example of the second aspect of the present disclosure, coating the barrier coating on the surface of the primer layer comprises: coating the barrier coating on the surface of the primer layer by a reverse coating roller.

In any example of the second aspect of the present disclosure, after the barrier coating is coated on the surface of the primer layer, the preparation method further includes: aging the cellulose composite film at a temperature of 30° C. to 40° C. The above are only preferred examples of the present disclosure and are not intended to limit the patent scope of the present disclosure. All equivalent structures or equivalent process transformations made by using the description of the application and the accompanying drawings are directly or indirectly used in other related technical fields are all included in the patent protection scope of the present disclosure in the same way.

What is claimed is:

1. A cellulose composite film, comprising:
    a cellulose film;
    a primer layer disposed on one side of the cellulose film;
    a barrier layer disposed on one side of the primer layer;
    wherein the cellulose film comprises a regenerated cellulose film, the primer layer comprises polyurethane film-forming resin, and the barrier layer comprises a polyvinylidene chloride (PVDC) coating with an antifogging agent.

2. The cellulose composite film according to claim 1, wherein the antifogging agent comprises one or more of: stearin glyceryl acid ester, xylitol ester, lauric acid or sorbitol monopalmitate.

3. The cellulose composite film according to claim 1, wherein a thickness of the cellulose film is 20 μm~40 μm; a thickness of the primer layer is 0.2 μm~0.4 μm; and a thickness of the barrier layer thickness is 1.5 μm~3 μm.

4. The cellulose composite film according to claim 1, wherein a coating dry weight of the primer layer on one side of the cellulose film is 0.3 g/m²~0.5 g/m².

5. The cellulose composite film according to claim 1, wherein a coating dry weight of the barrier layer on one side of the primer layer is 2.0 g/m²~4.0 g/m².

6. The cellulose composite film according to claim 1, wherein the barrier layer comprises following raw materials:
100 parts by weight of PVDC monomer, 1.5~3 parts by weight of emulsifier, 0.2~0.6 parts by weight of initiator agent, 0.05~0.2 parts by weight of buffer, 3~5 parts by weight of antifogging agent and 1.5~2.5 parts by weight of anti-sticking agent.

7. The cellulose composite film according to claim 6, wherein, based on a total mass of the PVDC monomer, the PVDC monomer comprises 85 wt %~92 wt % of vinylidene chloride, 7 wt %~9.5 wt % of methyl acrylate and 0.5 wt %~6 wt % of acrylic acid.

8. A method for producing a cellulose composite film, comprising:
providing a cellulose film;
coating an undercoating glue on one side of the cellulose film, and forming a primer layer;
coating a barrier coating on one side of the primer layer, and forming a barrier layer to obtain the cellulose composite film;
wherein the cellulose film comprises a regenerated cellulose film, the primer layer comprises polyurethane film-forming resin, and the barrier layer comprises a polyvinylidene chloride (PVDC) coating with an antifogging agent.

9. The method according to claim 8, wherein forming the barrier layer further comprises:
forming the barrier layer by mixing 100 parts by weight of PVDC monomer, 1.5~3 parts by weight of emulsifier, 0.2~0.6 parts by weight of initiator, 0.05~0.2 parts by weight of buffer, 3~5 parts by weight of antifogging agent and 1.5~2.5 parts by weight of anti-sticking agent.

10. The method according to claim 9, further comprising:
mixing one or more of stearin glyceryl acid ester, xylitol ester, lauric acid or sorbitol monopalmitate to form the antifogging agent.

11. The method according to claim 9, further comprising:
mixing, based on a total mass of the PVDC monomer, 85 wt %~92 wt % of vinylidene chloride, 7 wt %~9.5 wt % of methyl acrylate and 0.5 wt %~6 wt % of acrylic acid to form the PVDC monomer.

12. The method according to claim 8, wherein coating the barrier coating on one side of the primer layer further comprises:
coating the barrier coating by a reverse coating roller on one side of the primer layer.

13. The method according to claim 8, further comprising:
aging the cellulose composite film at a temperature of 30° C.~40° C. after coating the barrier coating on one side of the primer layer.

14. A product packaging, comprising: a cellulose composite film, wherein the cellulose composite film further comprises:
a cellulose film;
a primer layer disposed on one side of the cellulose film;
a barrier layer disposed on one side of the primer layer;
wherein the cellulose film comprises a regenerated cellulose film, the primer layer comprises polyurethane film-forming resin, and the barrier layer comprises a polyvinylidene chloride (PVDC) coating with an antifogging agent.

15. The product packaging according to claim 14, wherein the antifogging agent comprises one or more of: stearin glyceryl acid ester, xylitol ester, lauric acid or sorbitol monopalmitate.

16. The product packaging according to claim 14, wherein a thickness of the cellulose film is 20 μm~40 μm; a thickness of the primer layer is 0.2 μm~0.4 μm; and a thickness of the barrier layer thickness is 1.5 μm~3 μm.

17. The product packaging according to claim 14, wherein a coating dry weight of the primer layer on one side of the cellulose film is 0.3 g/m²~0.5 g/m².

18. The product packaging according to claim 14, wherein a coating dry weight of the barrier layer on one side of the primer layer is 2.0 g/m²~4.0 g/m².

19. The product packaging according to claim 14, wherein the barrier layer comprises following raw materials:
100 parts by weight of PVDC monomer, 1.5~3 parts by weight of emulsifier, 0.2~0.6 parts by weight of initiator agent, 0.05~0.2 parts by weight of buffer, 3~5 parts by weight of antifogging agent and 1.5~2.5 parts by weight of anti-sticking agent.

20. The product packaging according to claim 19, wherein, based on a total mass of the PVDC monomer, the PVDC monomer comprises 85 wt %~92 wt % of vinylidene chloride, 7 wt %~9.5 wt % of methyl acrylate and 0.5 wt %~6 wt % of acrylic acid.

* * * * *